United States Patent
St. John-Larkin

(10) Patent No.: US 8,495,693 B2
(45) Date of Patent: Jul. 23, 2013

(54) SYSTEMS AND METHODS FOR TIME SHIFTING IN MULTIPLE VIDEO PRESENTATION

(75) Inventor: David Christopher St. John-Larkin, Denver, CO (US)

(73) Assignee: EchoStar Technologies L.L.C, Englewood, CO (US)

( * ) Notice: Subject to any disclaimer, the term of this patent is extended or adjusted under 35 U.S.C. 154(b) by 466 days.

(21) Appl. No.: 12/234,433

(22) Filed: Sep. 19, 2008

(65) Prior Publication Data

US 2009/0083816 A1   Mar. 26, 2009

Related U.S. Application Data

(60) Provisional application No. 60/974,354, filed on Sep. 21, 2007.

(51) Int. Cl.
*G06F 3/00* (2006.01)
*G06F 13/00* (2006.01)
*H04N 5/445* (2006.01)
*H04N 7/173* (2006.01)

(52) U.S. Cl.
USPC ............. 725/114; 725/38; 725/43; 725/47; 725/50; 725/52

(58) Field of Classification Search
USPC ...................... 725/88, 114, 37–61
See application file for complete search history.

(56) References Cited

U.S. PATENT DOCUMENTS

| 5,590,156 | A  * | 12/1996 | Carney ........................... 375/316 |
| 7,373,650 | B1 * | 5/2008 | Rodriguez et al. ............... 725/41 |
| 7,383,563 | B1 * | 6/2008 | Rashkovskiy .................. 725/58 |
| 7,774,811 | B2 * | 8/2010 | Poslinski et al. ................ 725/45 |
| 2003/0182658 | A1 * | 9/2003 | Alexander ....................... 725/60 |
| 2005/0071782 | A1 * | 3/2005 | Barrett et al. ................. 715/838 |
| 2006/0282852 | A1 * | 12/2006 | Purpura et al. .................. 725/39 |
| 2007/0204297 | A1 * | 8/2007 | Gonzalez ........................ 725/41 |
| 2007/0204302 | A1 * | 8/2007 | Calzone ......................... 725/46 |
| 2007/0220551 | A1 * | 9/2007 | Shanks et al. ................... 725/43 |
| 2008/0060006 | A1 * | 3/2008 | Shanks et al. ................... 725/38 |
| 2008/0209472 | A1 * | 8/2008 | Shanks et al. ................... 725/43 |
| 2009/0064221 | A1 * | 3/2009 | Stevens ......................... 725/38 |
| 2009/0228943 | A1 * | 9/2009 | Ramaswamy et al. ........ 725/109 |

* cited by examiner

*Primary Examiner* — Scott Beliveau
*Assistant Examiner* — Alexander Q Huerta
(74) *Attorney, Agent, or Firm* — Seed IP Law Group PLLC

(57) ABSTRACT

Systems and methods may provide for control of one or more feeds of a multi-feed channel. Such control may implement functions such as pausing, playing, rewinding, fast forwarding, slowing, replaying and zooming. The control may be selectively applied to the feeds so that one, selected ones or all of the feeds are controlled. Thus, implementations may allow a user to selectively interact with video feeds, as well as corresponding audio feeds, while viewing the multi-feed channel.

16 Claims, 4 Drawing Sheets

SYSTEMS AND METHODS FOR TIME SHIFTING IN MULTIPLE VIDEO PRESENTATION

CROSS REFERENCE TO RELATED APPLICATION

The present application claims the benefit under 35 U.S.C. §119(e) to U.S. Provisional Patent Application No. 60/974,354, which was filed on Sep. 21, 2007, and entitled "SYSTEMS AND METHODS FOR TIME SHIFTING IN MULTIPLE VIDEO PRESENTATION," which is incorporated by reference into the present application in its entirety.

TECHNICAL FIELD

The inventive field relates generally to presenting multiple video feeds as a single channel via a client device, such as a set top box (STB), satellite receiver, digital video recorder (DVR) or similar device, and optionally to time shifting for such a presentation.

BACKGROUND DISCUSSION

The proliferation of subscription television programming, the increasing number of available channels, and the corresponding increase in television programming have led to continued development of various user interactive features. Exemplary features may include the ability to set timers to record programs, the ability to set user preferences, for example, for how information is displayed, and the ability to lock or otherwise control access to channels. In particular, systems and methods have been developed that allow a user to control the display of a program through functions such as pause, play, rewind, fast forward, replay, slow, etc.

In addition to providing program information, a service provider (e.g., a digital broadcast service provider) may provide one or more channels that present multiple feeds for different programs. For example, programs carried by multiple channels may be presented on a selected channel to provide the user with a simultaneous display of multiple programs. For example, "a sports mix," a "news mix," a "guide channel" or a menu for selecting pay-per-view programming may be envisioned as the selected channel. The user may be able to select an audio feed corresponding to any one of the displayed channels, or a periodic rotation between the audio feeds may be implemented, either with or without user input. In general, the selected channel is preset at the head end (e.g., at the service provider) with the programs of certain channels to be displayed and the audio is selected at the client-side (e.g., using a STB, DVR, etc.).

Such an approach may be useful to provide the user with a simultaneous presentation of related programs, such as programs being displayed on related channels, including (for example) sports channels, news channels and/or movie channels. The user may thus keep abreast of multiple channels of interest and/or may be provided with the opportunity to view and select one of the group of displayed channels and thus view only the selected program. For example, the user may be provided with multiple feeds on a single channel for a particular event, such as the Olympics, so that multiple live programs may be viewed, etc.

SUMMARY

As discussed above, client devices may receive a channel that presents multiple video feeds for simultaneous viewing. However, many conventional client devices may not be configured to interact with such video feeds, other than perhaps to select a particular audio feed corresponding to one of the video feeds or to select a channel corresponding to one of the video feeds to be viewed separately.

Various embodiments relate to systems and methods that provide improved user interaction with video and/or audio feeds that are presented to the user via a single channel. In particular, various embodiments provide user control of such video and/or audio feeds. In embodiments, the user control may provide functions such as pause, play, rewind, fast forward, replay, slow, zoom, and the like.

Various embodiments may permit a user to selectively control video and audio feeds that are presented as a single channel, which may enhance user interactivity with such multi-feed channels.

BRIEF DESCRIPTION OF THE DRAWINGS

Various details of the present invention may be better understood on reading the following detailed description of non-limiting embodiments, and on examining the accompanying drawings, in which.

DETAILED DESCRIPTION OF EMBODIMENTS

As used herein, the term "client device" is intended to encompass a device that is configured to receive programs and/or program information from a broadcast source (e.g., satellite, cable, Internet, etc.) and to facilitate display the programs and/or the program information on a display device, such as a television or a monitor. Although not restricted to a particular implementation, the term "client device" is intended to encompass set top boxes, satellite receivers, digital video recorders, and the like. The client devices described herein may be embodied in software and/or hardware that facilitate the reception and display of programs and/or program information from a broadcast source of any suitable type (e.g., satellite, Internet protocol, wireless, etc.).

The embodiments shown in the Figures illustrate systems and methods that may allow client devices of a broadcast system to control one or more feeds of a multi-feed channel. The illustrated systems and methods provide examples of how a multi-feed channel and control thereof may be implemented. However, it should be understood that other implementations are possible and contemplated. Also, it should be understood that reference herein to a multi-feed channel is intended to encompass any known or hereafter developed approach to displaying a plurality of video feeds via a single channel.

Figure 1:
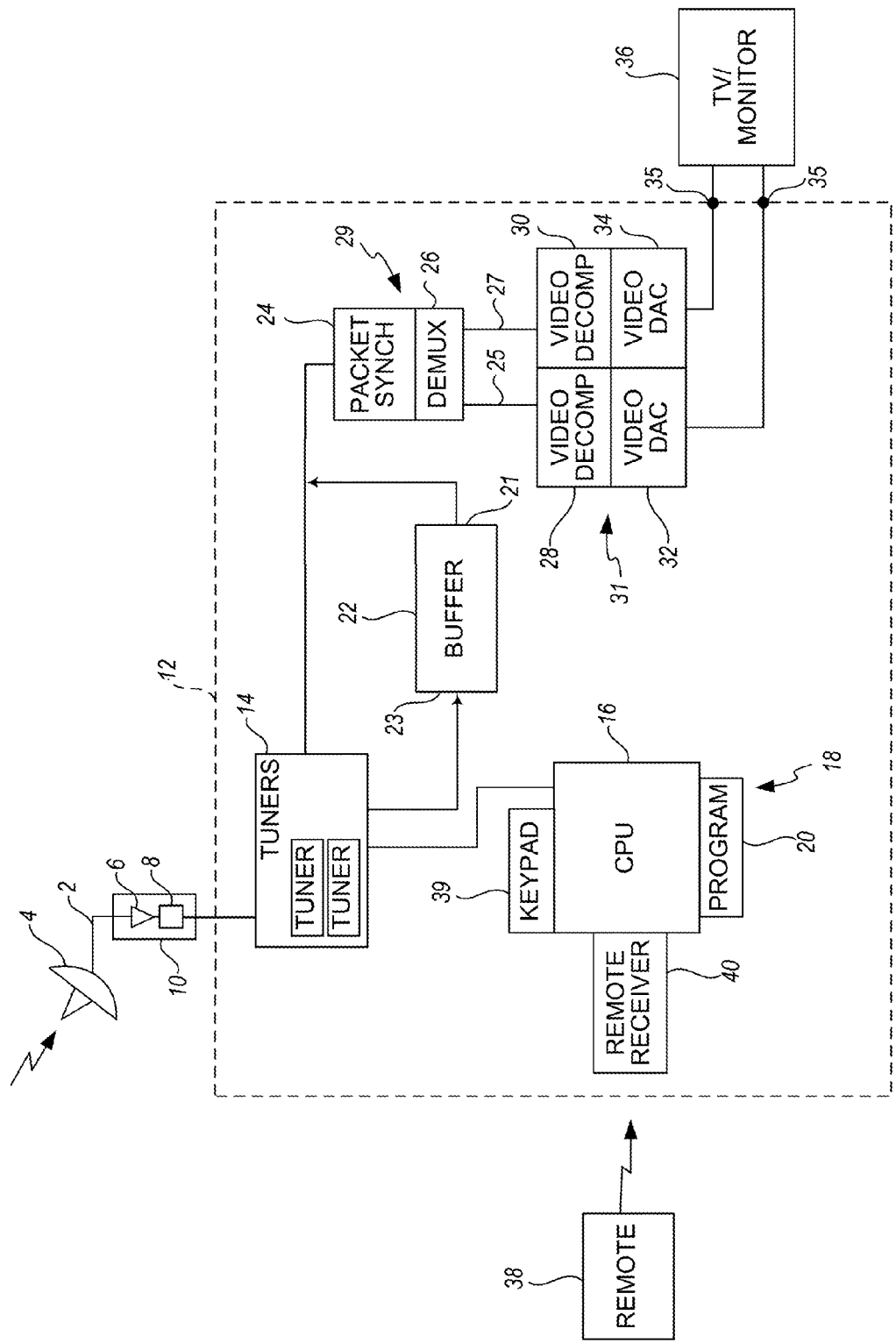
FIG. 1 is an exemplary block diagram illustrating components to receive and process video and audio signals as part of an example of a broadcast satellite television system.

FIG. 1 is a schematic block diagram related components for receiving and processing video and audio information as well as data. The example shown may embody a direct broadcast satellite system, which may incorporate packetized transmission signals, for example, according to a suitable standard. However, any broadcast programming source, such as off-air analog or digital terrestrial transmission, cable television, high definition television, or the like may be used. Additionally, with recent advances in telephony and computer data transmissions, it should be understood that other sources such as analog or digital telephony, internet connections, computer network connections, or fiber optic signals may be used. "Broadcast" is used herein in a broad sense to define the transmission of signals from any source to one or more client devices or users.

Encrypted direct broadcast satellite signals, ranging from approximately 12.2 GHz to approximately 12.7 GHz, may be received as downlinked signals 2 by a satellite antenna 4, such as a parabolic dish. Front end processing of the satellite signal may be accomplished by a low noise block down converter feed provided at the antenna focal point. This may include a converter module 10 with a low noise amplifier 6 that receives the signals from the antenna 4 and, via a block down converter 8, converts the entire frequency band of satellite signals to a lower, intermediate frequency range of approximately 0.95 to 2.15 GHz, which may be transmitted via coaxial cable to a satellite receiver 12 or other client device (the frequencies may be converted again after transmission along the cable or may be converted into different frequencies prior to cable transmission). The receiver may include one or more tuners 14 for selecting a specific frequency band or channel from the downlinked signal 2 and demodulating the corresponding audio and video signals. The tuners 14 may be controlled by a CPU 16 to feed the signals to either a buffer 22 or a digital decoder 29, depending on the state of a delay program 20. In some embodiments, the digital decoder 29 may include an error correction and packet synchronization module 24 and a packet demultiplexer 26. The error correction and packet synchronization module 24 may combine a suitable decoder and a Reed-Solomon and Viterbi forward error corrector, for example. The decoder may accept the digital signals from the tuners 14 and may convert them to data and checksum bits corresponding to packets in the data stream 2. The forward error correction logic may accept the data and checksum bits and may correct errors that occurred in the transmission of data stream 2. The error correction and packet synchronization module 24 may output a fully compliant transport stream as defined by a suitable specification. Output from the error correction and packet synchronization module 24 may be directed to the packet demultiplexer 26. The given error correction is just one example.

The packet demultiplexer 26 may be an integrated circuit that accepts the packetized, time domain multiplexed data stream of the transport stream and routes the packets to various areas within satellite receiver 12. Audio may be output as an audio stream 27 or feed, and may be accepted by an audio decompressor 30 of a display decoder 31. Video may be output as a video stream 25 or feed, and may be accepted by a video decompressor 28 of the display decoder 31. Audio stream 25 and video stream 27 may be, for example, fully compliant audio and video program elementary streams as defined by suitable standards. In addition to routing packets of data, packet demultiplexer 26 may also unscramble encrypted data, provide buffering of the data, and maintain program clock reference handling to keep the local clock synchronized with the clock at the uplink center.

The display decoder 31 may receive the video stream 25 and the audio stream 27 from the digital decoder 29. As noted above, the display decoder 31 may include the video decompressor 28 and the audio decompressor 30, which decompress the video stream 25 and the audio stream 27, respectively, into digital signals. The display decoder 31 may also include a digital to analog converter 32 and a digital to analog converter 34, which may convert the video stream 25 and the audio stream 27, respectively, into analog signals. The resulting baseband analog signals may then be sent to connectors 35 located on the outside of satellite receiver 12, which may connect to a TV/monitor 36.

A buffer 22 may comprise a storage device that may be organized as a queue including a head 21 and a tail 23. The queue may store the signals in a first-in/first-out scheme, such that demodulated audio and video signals are passed from the tuners 14 to the tail 23, progress through the queue, and are routed from the head 21 to the digital decoder 29. In some embodiments, the buffer 22 may be implemented as one or more high speed hard disks, but any storage device that may be organized as a queue, which has a high storage capacity for audio and video signals, and which operates at acceptable speeds (e.g., solid state, magnetic, circuitry, optical) may be used.

The delay program 20 may comprise an instruction set that manipulates the buffer 22 to delay the presentation of broadcast programming information to a viewer. While the delay program 20 may be implemented through hardware, in some embodiments the delay program 20 comprises a software program stored in memory 18. Memory 18 may preferably be DRAM, but also may be flash, ferroelectric, or other nonvolatile memory, or conventional RAM with a battery backup. In some embodiments, an LSI 64002 microprocessor may be used as the CPU 16, although any suitable processor may be used.

A user input may be supplied to the receiver 12, for example, either through a remote control device 38 or a keypad 39. The remote control device 38 may send a UHF or infrared signal to a remote receiver 40, which may pass the desired command to the CPU 16. The keypad 39, for example, located on the satellite receiver 12, may also supply user commands to the CPU 16.

While the satellite receiver 12 may use a source of direct broadcast satellite signals, other sources capable of transmitting digital and analog broadcast signals may be used. These audio/video sources may include, but are not limited to: DBS satellite, cable, HDTV, analog or digital terrestrial sources, analog or digital telephony, internet connections, computer network connections, or optical fiber sources. In general, it should be understood that the example of components of a satellite broadcast system shown in FIG. 1 is for the sake of illustration only, for a better understanding of the inventive details disclosed herein.

Figure 2:
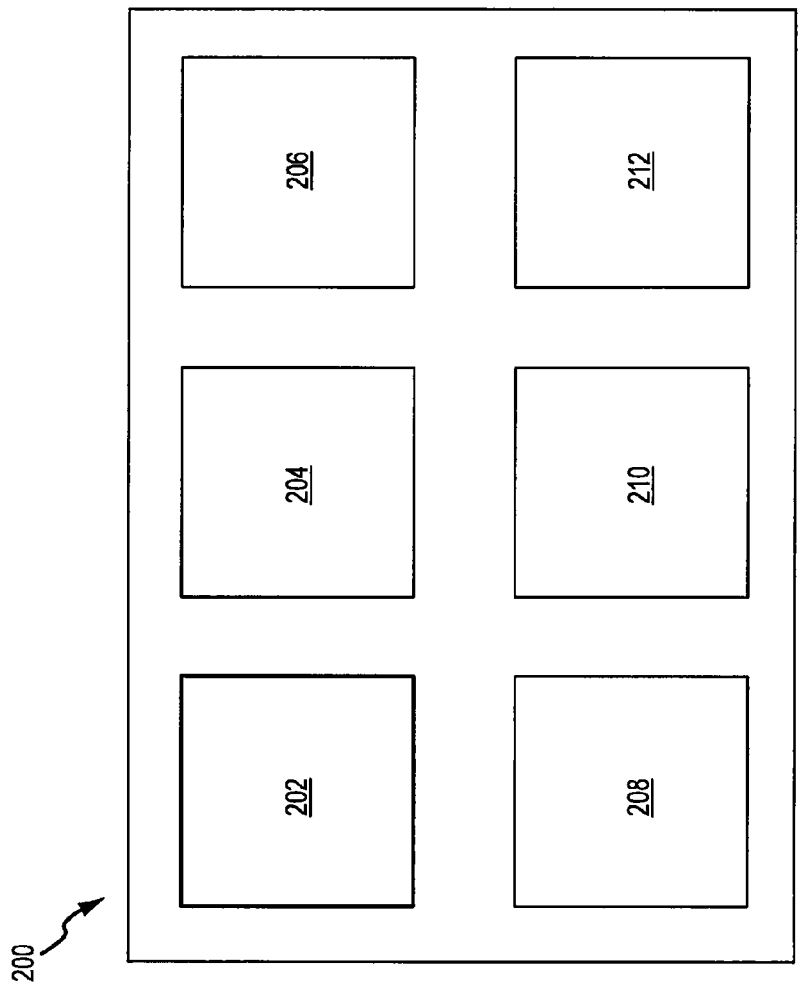
FIG. 2 is an exemplary block diagram illustrating an example of a display for a multi-feed channel.

FIG. 2 is a simplified block diagram illustrating an example of a display 200 for a multi-feed channel. As shown, the display may include portions for displaying a plurality of video feeds 202, 204, 206, 208, 210 and 212. While six video feeds are shown, it should be understood that the display 200 may be configured to display any desired number of video feeds. The display 200 may be obtained by selecting the multi-feed channel using one of the tuners 14 of the client device 12. For example, a multi-feed channel may be configured to include feeds from a plurality of preset channels such that an active tuner (i.e., a tuner currently being used to provide content for display) may be tuned to the multi-feed channel. Either the signal provided from the broadcast service provider for the multi-feed channel may include the plurality of video feeds, or latent tuners 14 (i.e., tuners not currently being used to provide content for display) may be used to receive individual feeds and provide them to the active tuner, for example, via the CPU 16. The active tuner may thus provide such feeds, in addition to a feed received by the active tuner, for display as a single channel. Still further, multiple tuners may be tuned to individual channels and outputs for the tuners may be aggregated to be displayed as a single channel.

The audio feeds corresponding to the plurality of video feeds may also be provided to the active tuner, either directly from the broadcast service provider and/or via the latent tuners. However, it may be desirable to provide only one of the audio feeds at a time for output to the TV/monitor. Thus, as illustrated by the bold border of the displayed video feed 202, one of the video feeds may be selected for the corresponding audio feed to be output. Such an approach may allow a user to input a command to control selection of the audio feed by selecting one of the displayed video feeds. Alternatively or additionally, the audio feed being outputted may automatically change, for example, rotating through the audio feeds corresponding to the displayed video feeds periodically. In any case, the video feed corresponding to the audio feed being output may include a highlighted border or other indication of being selected for audio output.

In some embodiments, it is envisioned that a user of the client device 12 may be allowed to determine the video and audio feeds that are provided to the multi-feed channel, as discussed in more detail below. Alternatively or additionally, is envisioned that the video and audio feeds that are provided to the multi-feed channel may be determined, either at the client device or at the broadcast service provider, based on user preferences, historical viewing habits, or other information to tailor the feeds to user interests.

While the video and audio feeds are described above as "channels," it should be understood that this is not used in a restrictive sense to mean that each feed displays different audio and/or video. For example, the plurality of video feeds may be of different camera angles or points of view of the same event.

Regardless of how the broadcast system, client device and/or multi-feed channel are implemented, some embodiments described herein are directed to controlling the video and audio feeds based on user inputs or other conditions. As used herein, "control" of the video and audio feeds means control other than selection for output. As such, selecting one of the plurality of video feeds to output the corresponding audio feed is not considered to control the video or audio feeds. Rather, control of the video and audio feeds is considered to encompass functions, such as pause, play, rewind, fast forward, slow, etc., based, for example, on time shifting of the feeds. Control may encompass other functions as well, such as zooming into a particular segment of a displayed feed, or the like.

In some embodiments, such control may be of only an active one of the video feeds, i.e., corresponding to the audio feed being outputted, and the associated audio feed. For example, a user may select one of the displayed video feeds to have the corresponding audio feed outputted. The user may then be able to control the selected video and audio feed as desired.

Alternatively or additionally, the control may be applied to more than one or all of the video feeds and the corresponding audio feeds. For example, the user may wish to input a command to simultaneously control all of the video feeds and the corresponding audio feeds, such as to pause all. The user may also want to apply a command to only a selected plurality of the feeds, for example, to pause all but one. It should be understood that various control configurations are contemplated and that the disclosure provided herein is not exhaustive, but merely illustrative.

In some embodiments, in addition to or alternatively to the foregoing, control may be implemented automatically, i.e., without user input. For example, in response to a video and/or audio event occurring in a feed, the feed may be controlled automatically. Video and/or audio events may be predefined, either by the user of the client device or by the broadcast service provider, with predefined control functions associated therewith.

For example, a video event may be an "instant replay" in a video feed of a sporting event. When the "instant replay" occurs, the client device may automatically control the video feed to slow down its display so that a "slow motion" effect is implemented. Another example of a video and/or audio event may be a score or goal in a sporting event. For example, the goal line appearing in the video feed, combined with increased crowd noise in the audio feed, may trigger control such as rewinding and pausing the feeds to allow the user to select to resume the display and view the score or goal. This may be implemented, for example, by setting or sending a flag in the video stream to mark a rewind point or by linking to signals in the feed.

Additionally or alternatively, control may be implemented automatically based on metadata transmitted with the video and/or audio feeds. The metadata may be pre-existing as part of the program being broadcast, or may be added, for example, by the broadcast service provider, to provide triggers for the automatic control of the feeds by client devices configured to respond to such triggers.

Figure 3:
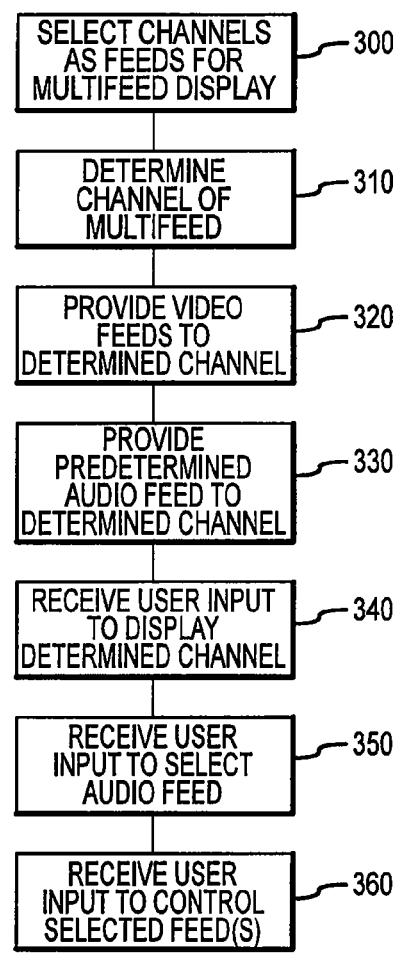
FIG. 3 is an exemplary block diagram illustrating an example of operations for providing and controlling a multi-feed channel.

FIG. 3 is a simplified block diagram illustrating an example of operations for providing and controlling a multi-feed channel. It should be understood that such operations may occur at the broadcast service provider, client device, or elsewhere, as appropriate or desired. For example, although not illustrated, it should be understood that an intermediate device, such as a server or hub, may be used to implement such operations.

Initially, a plurality of channels may be selected as feeds in operation 300. This may be performed at the head end (e.g., at the broadcast service provider) or at the client device based on user input, as discussed above. Further, the "channels" may be selected from other channels that are being broadcast, or may be feeds that are otherwise unavailable, such as different views of the same program. In some embodiments, the channels or feeds may be selected based on user preferences, viewing habits, etc., either for a particular client device or collectively for a plurality of client devices.

Also, the channel for broadcasting the plurality of feeds may be determined, either at the head end or at the client device, in operation 310. For example, the broadcast service provider may make a certain number of channels available for providing multi-feed channels. The provider may specify a channel for the multi-feed channel and provide that channel to one or more client devices. As discussed above, the user of a client device may be allowed to specify the channel for the multi-feed channel, for example, and either select a predetermined set of feeds available from the provider or select a desired set from available channels, thus customizing the multi-feed channel.

Once the channel for broadcasting the plurality of feeds is determined, the selected video feeds may be provided to the determined channel in operation 320. For example, the selected video feeds may be assembled at the head end and broadcast together via the determined channel. Alternatively, the selected video feeds may be broadcast separately and assembled at the client device. As discussed above, a plurality of tuners at the client device may allow the plurality of video feeds to be received and then assembled for display via the multi-feed channel selected for one of the tuners.

In addition to the video feeds, the corresponding audio feeds may be provided to the determined channel in operation 330. However, unlike the simultaneous display of the plurality of feeds, only one of the audio feeds may be output at a time. In some embodiments, a predetermined audio feed may be provided to the channel for output, such as the audio feed corresponding to the uppermost, leftmost displayed video feed. As discussed above, the audio feed being output may change, for example, periodically or based on user input. In some embodiments, a single audio feed may be suitable for all of the video feeds, such as video feeds of the same program, or video feeds of the same event from multiple angles. However, even in such case a corresponding plurality of audio feeds may be appropriate so that separate control of one of the video feeds may also control the corresponding audio feed, without affecting the audio feeds corresponding to other video feeds.

Once the multi-feed channel is established, a user input may be received to display the multiple feeds on the determined channel in operation 340. For example, the user may select the determined channel via a tuner of the client device by entering that channel on the remote control or keyboard. As discussed above, the user may also input a command to select one of the audio feeds to be output, for example, by selecting one of the displayed video feeds, in operation 350. Further, the user may input other commands to control one or more of the displayed video feeds, as well as the corresponding audio feed(s), as appropriate or desired, in operation 360. As discussed above, the control provided by such other commands may include functions such as pause, play, rewind, fast forward, slow, replay, zoom, etc., and may be applied to one, selected or all of the video feeds (and corresponding audio feeds as appropriate).

Figure 4:
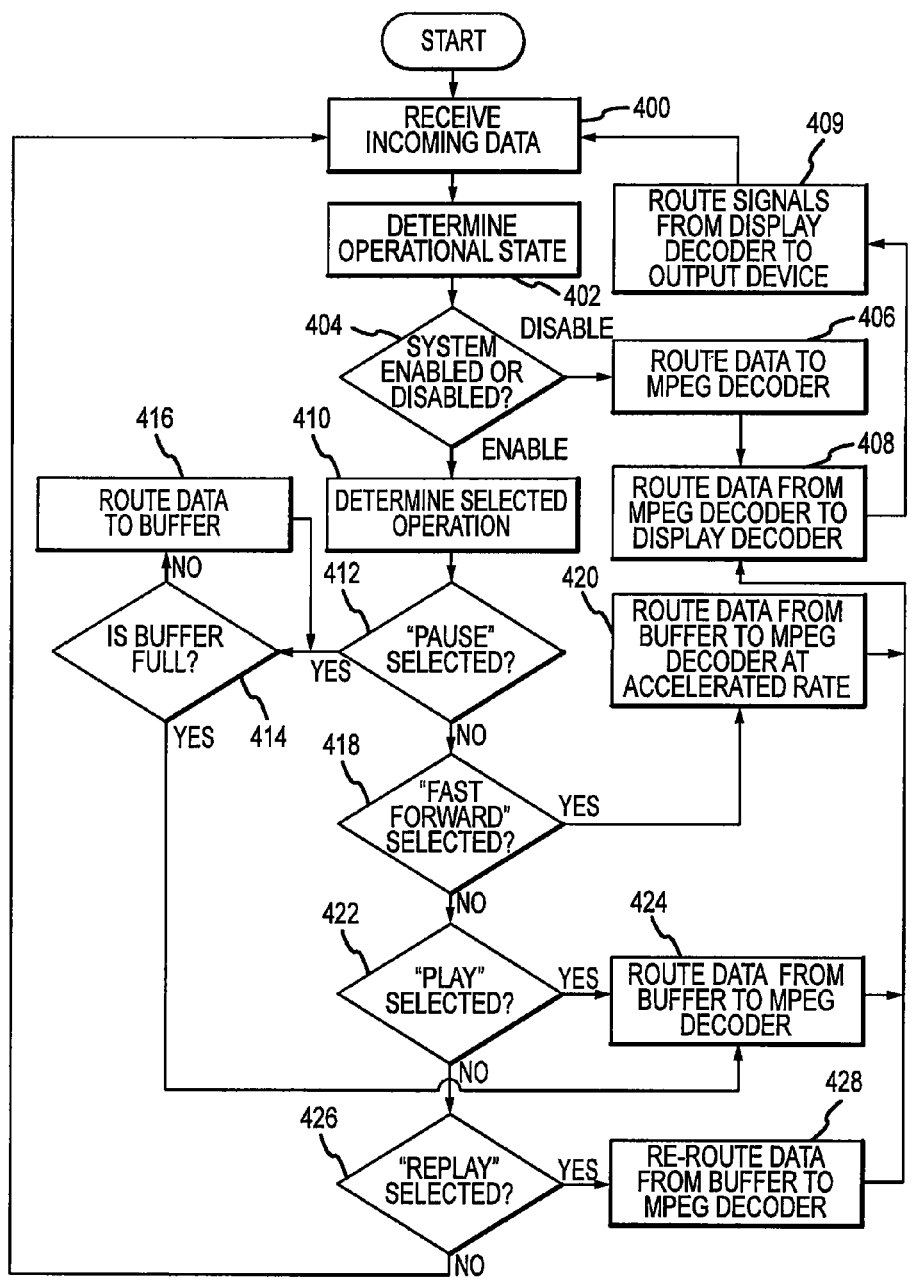
FIG. 4 is a flowchart illustrating an example of detailed operations for controlling one or more feeds of a multi-feed channel.

FIG. 4 is a flowchart illustrating an example of detailed operations for controlling one or more feeds of a multi-feed channel. It should be understood that not all possible control is illustrated, for the sake of brevity and clarity. Further, it should be understood that various modifications are possible, for example, to accomplish various control functions and/or user interactivity with the feeds of the multi-channel. Also, for the sake of brevity and clarity, the flowchart of FIG. 4 does not address creating of a multi-feed channel, i.e., selection of the feeds and/or channel for the multi-feed channel, at the client device.

Beginning at 400, the tuner or tuners 14 may receive, select and demodulate incoming audio and video data corresponding to a multi-feed channel selected by a user. Operation may continue to 402, where the user may either enable or disable a time shifting system. Then, a determination of the operational state (e.g., enabled or disabled) of the system may be made at 404.

If the time shifting system is disabled, operation may continue to 406, where the incoming video and audio signals may be routed from the tuner 14 to the digital decoder 29. Operation may continue to 408, where signals outputted from the digital decoder 29 may be routed to the display decoder 31, and then output to the TV/monitor 36 at 409 (i.e., the plural video feeds and one of the audio feeds). Operation may then return to 400.

If the time shifting system is enabled, operation may continue to 410, where the user may select a desired operation. User commands may be input, for example, via individual keys on the remote control device 38 or the keypad 39. The operations that may be selected by a user may include, in this example, pause, play, replay, and fast forward. Additionally, the user may be allowed to determine to which of the feeds such operation are to be applied (e.g., a selected feed or feeds, or all feeds). Further, the user may be able to disable the time shifting system. As an alternative, not shown, the user may be allowed to enable or disable the time shifting system, for example, prior to the determination of the operational state at 402.

For the sake of brevity and clarity, FIG. 2 illustrates evaluation of selected operations 412, 418, 420 and 428 in a sequential manner. However, it should be understood that such operations may be encompassed by the operations at 410 of determining selected operation.

If the user wishes one or more of the video and corresponding audio signals to be delayed before being output to the TV monitor 36, a pause command may be selected (412). Operation may continue to 414, where the buffer 22 may be checked to see if it is full. If the buffer 22 is not full, the one or more video and corresponding audio signals may be routed to the tail 23 of the buffer 22 at 416. Operation may then return to 414.

If the buffer 22 is full, then stored signals may be flushed from the head 21 of the buffer 22 to allow storage of the one or more video and corresponding audio signals. Operation may continue to 422, where the one or more video and corresponding audio signals may be routed from the head 21 of the buffer 22 to the digital decoder 29. Operations at 408 and 409 may then be performed as discussed above to route signals to the display decoder 31 and then output through connectors 35 to TV/monitor 36.

If a fast forward command is selected (418), operation may continue to 420, where the one or more video and audio signals stored in the buffer 22 may be routed from the head 23 to the digital decoder 29 at an accelerated rate. Operations at 408 and 409 may then be performed as discussed above to route signals to the display decoder 31 at the accelerated rate and then output through connectors 35 to TV/monitor 36, resulting in the one or more video and audio signals being displayed over the TV/monitor 36 at the accelerated rate.

The fast forward operation may flush the buffer 22, such that the buffer 22 is exhausted during the fast forward operation. In such an event, the system may transition to a normal state in which the one or more video and audio signals are routed directly to the digital decoder 29 (e.g., operations 406, 408, 409).

If a play command is selected (422), operation may continue to 424, where the one or more video and audio signals stored in the buffer 22 may be routed from the head 23 to the digital decoder 29 at an at a normal rate for viewing. Operations at 408 and 409 may then be performed as discussed above to route signals to the display decoder 31 at the normal rate and then output through connectors 35 to TV/monitor 36, resulting in the one or more video and audio signals being displayed over the TV/monitor 36 at the normal rate.

If a replay command is selected (426), operation may continue to 428, where the buffer 22 may be closed to incoming video and audio signals, and video and audio signals stored in the buffer 22 may be accessed, without being flushed, and may be repeatedly routed to the digital decoder 29, the display decoder 31, and output as in operations at 408 and 409, so the user may replay those video and audio signals as many times as desired. Once all operations (412, 418, 422, 426) are evaluated, operation may return to 400.

Although not illustrated in FIG. 4, it should be understood that the video and corresponding audio feeds may automatically be buffered, for example, as time passes while the multi-feed channel tuned. Such an approach may enable operations, such as rewind, without having to select a pause operation to load the buffer. Further, although user control of the video and audio feeds of the multi-feed channel are illustrated in FIG. 4, it should be understood that such operations may be automatically implemented, for example, based on video and/or audio events and/or metadata of the program(s) of the feeds. As such, the operations shown in the flowchart of FIG. 4 should be understood as being illustrative only and not limiting.

Although various details have been described herein with reference to particular embodiments, it is to be understood that these embodiments are merely illustrative of principles and applications. It is therefore to be understood that numerous modifications may be made to the illustrative embodiments and that other arrangements may be devised without departing from the spirit and scope of this disclosure.

What is claimed is:

1. A method for controlling one or more feeds of a multi-feed channel, the method comprising:
    receiving, at a client device, a user input enabling a time-shifting system, the enabled time shifting system allowing the client device to recognize a control command from the user, the control command being one of pausing, playing, rewinding fast forwarding, slowing, replaying and zooming;
    receiving, at the client device, a plurality of video feeds through a plurality of tuners in the client device, at least one of the plurality of tuners providing one of the plurality of video feeds to be included in a multi-feed channel;
    generating, by the client device, the multi-feed channel from the received plurality of video feeds, the multi-feed channel generated through one tuner from an aggregation of the received plurality of video feeds, the multi-feed channel including the received plurality of video feeds to be displayed simultaneously;
    transmitting, by the client device, the multi-feed channel to a display device associated with the client device;
    receiving, at the client device, a selection of at least one of the displayed plurality of video feeds, the selection indicated by a placement of a selection indicator over the at least one of the plurality of video feeds on the display device;
    subsequent to receiving the selection, receiving, by the client device, the control command to control the selected at least one of the plurality of video feeds on the display device; and
    controlling, by the client device, the selected at least one of the plurality of video feeds based on the received control command while maintaining display of the not-selected plurality of video feeds included in the multi-feed channel.

2. The method of claim 1, wherein generating the multi-feed channel comprises selecting at least one of the plurality of video feeds based on at least one user preference associated with the client device.

3. The method of claim 1, wherein generating the multi-feed channel comprises selecting at least one of the plurality of video feeds based on historical viewing habits associated with the client device.

4. The method of claim 1, wherein generating the multi-feed channel comprises selecting at least one of the plurality of video feeds based on a user input at the client device that identifies the at least one of the plurality of video feeds.

5. The method of claim 1, wherein receiving the selection of at least one of the displayed plurality of video feeds comprises
    receiving a plurality of selections indicated by a plurality of placements of the selection indicator over a plurity of video feeds on the display device; and
    wherein controlling the selected at least one of the plurality of video feeds comprises controlling the selected plurality of video feeds in the same manner based on the input control command.

6. The method of claim 1, wherein receiving the control command and controlling are performed automatically based on at least one of a video event and an audio event occurring in the at least one of the plurality of video feeds included in the multi-feed channel.

7. The method of claim 1, wherein receiving and controlling are performed automatically based on metadata transmitted with at least one of the at least one of the plurality of video feeds and an audio feed associated with the at least one of the plurality of video feeds included in the multi-feed channel.

8. The method of claim 1, wherein two of the received plurality of video feeds are feeds off different camera angles of the same event.

9. A client device for controlling one or more video feeds included in a multi-feed channel, the client device comprising:
    a tuner portion including a plurality of tuners, the tuner portion configured to receive a plurality of video feeds through the plurality of tuners and to generate a multi-feed channel from the received plurality of video feeds, the multi-feed channel including the plurality of video feeds to be displayed simultaneously; and
    a processor configured to receive a user input enabling a time shifting system, the time shifting system enabling the client device to recognize a control command, the control command being one of pausing, playing, rewinding, fast forwarding, slowing, replaying and zooming,
    receive a selection of at least one of the displayed plurality of video feeds, the selection indicated by a placement of a selection indicator over the at least one of the plurality of video feeds on the display device,
    subsequent to receiving the selection, receive a command to control the selected at least one of the plurality of video feeds, and
    control the selected at least one of the plurality of video feeds based on the received command while maintaining display of the non-selected plurality of video feeds included in the multi-feed channel, wherein
    the tuner portion further includes one tuner configured to aggregate the plurality of video feeds from the plurality of tuners into the multi-feed channel.

10. The client device of claim 9, wherein the tuner portion is configured to generate the multi-feed channel by selecting at least one of the plurality of video feeds based on at least one user preference associated with the client device.

11. The client device of claim 9, wherein the tuner portion is configured to generate the multi-feed channel by selecting at least one of the plurality of video feeds based on historical viewing habits associated with the client device.

12. The client device of claim 9, wherein the tuner portion is configured to generate the multi-feed channel by selecting at least one of the plurality of video feeds based on a user input that identifies the at least one of the plurality of video feeds.

13. The client device of claim 9, wherein the selection of at least one of the displayed plurality of video feeds is a selection of at least two of the displayed plurality of video feeds, the selection indicated by a plurality of placements of the selection indicator over the at least two of the plurality of video feeds on the display device, and wherein the processor is configured to control he selected at two of the plurity of video feeds in the same manner based on the received command.

14. The client device of claim 9, wherein the processor is configured to control the selected at least one of the plurality of video feeds based on at least one of a video event and an audio event occurring in the selected at least one of the plurality of video feeds.

15. The client device of claim 9, wherein the processor is configured to control the selected at least one of the plurality of video feeds based on metadata received with at least one of the selected at least one of the plurality of video feeds and an audio feed associated with the selected at least one of the plurality of video feeds.

16. The client device of claim 9, wherein the processor controls the selected at least one of the plurality of video feeds based on at least one of a video event and an audio event occurring in the at least one of the plurality of video feeds included in the multi-feed channel.

* * * * *

UNITED STATES PATENT AND TRADEMARK OFFICE
CERTIFICATE OF CORRECTION

PATENT NO.        : 8,495,693 B2                              Page 1 of 1
APPLICATION NO.   : 12/234433
DATED             : July 23, 2013
INVENTOR(S)       : David Christopher St. John-Larkin It is certified that error appears in the above-identified patent and that said Letters Patent is hereby corrected as shown below:

In the Claims

Column 9, Line 20:
Claim 1, "playing, rewinding fast forwarding, slowing," should read, --playing, rewinding, fast forwarding, slowing,--.

Column 10, Line 12:
Claim 7, "with at least one of the at least one of the plurality of video" should read, --with at least one of the plurality of video--.

Column 10, Line 65:
Claim 13, "is configured to control he selected at two of the plurality of" should read, --is configured to control the selected at least two of the plurality of--.

Signed and Sealed this
Twenty-third Day of September, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,495,693 B2 | Page 1 of 1 |
| APPLICATION NO. | : 12/234433 | |
| DATED | : July 23, 2013 | |
| INVENTOR(S) | : David Christopher St. John-Larkin | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 577 days.

Signed and Sealed this
Third Day of February, 2015

Michelle K. Lee
*Deputy Director of the United States Patent and Trademark Office*